United States Patent [19]
Papelard

[11] 3,975,591
[45] Aug. 17, 1976

[54] ELECTRONIC CAMERA

[75] Inventor: Michel Paul Papelard, Epinay-sur-Seine, France

[73] Assignee: Viteci S.A., Paris, France

[22] Filed: Feb. 8, 1974

[21] Appl. No.: 440,816

[30] Foreign Application Priority Data
Feb. 9, 1973 France .................. 73.04781

[52] U.S. Cl. .................... 178/7.2; 178/DIG. 29
[51] Int. Cl.² ................................... H04N 3/16
[58] Field of Search .............. 178/69.5 G, DIG. 29, 178/7.2

[56] References Cited
UNITED STATES PATENTS

| | | | |
|---|---|---|---|
| 2,833,957 | 5/1968 | Horowitz | 178/DIG. 29 |
| 2,930,848 | 3/1960 | Fathauer | 178/69.5 G |
| 2,978,537 | 4/1961 | Kruse et al. | 178/DIG. 29 |
| 3,006,995 | 10/1961 | Fathauer | 178/69.5 G |
| 3,180,934 | 4/1965 | Altman et al. | 178/DIG. 29 |
| 3,206,547 | 9/1965 | Lietch et al. | 178/DIG. 29 |
| 3,315,034 | 4/1967 | White | 178/DIG. 29 |
| 3,578,908 | 5/1971 | Tompkins | 178/7.2 |
| 3,600,511 | 8/1971 | Cooksey | 178/7.2 |
| 3,777,063 | 12/1973 | Meacham | 178/69.5 G |
| 3,919,472 | 11/1975 | Dorsey et al. | 178/7.2 |

FOREIGN PATENTS OR APPLICATIONS

| | | | |
|---|---|---|---|
| 968,100 | 1964 | United Kingdom | 178/DIG. 29 |
| 1,158,781 | 1965 | United Kingdom | 178/DIG. 29 |

*Primary Examiner*—John C. Martin
*Attorney, Agent, or Firm*—Kinzer, Plyer, Dorn & McEachran

[57] ABSTRACT

An electronic camera with a vidicon tube, comprising a synchronization generator consisting of a frequency divider receiving the frequency of a quartz oscillator ($Q_1$) and supplying, by combination, the various synchronization signals, in which the synchronization generator piloted by the quartz oscillator ($Q_1$) consists of a first stage comprising the quartz oscillator ($Q_1$) energizing two gates (NAND 1,2), to provide an output frequency successively divided by dividing circuits ($Cl_{1, 2, 3, 4}$), furnishing the respective signals to a combining stage M, combining the various signs ($S_1$–$S_5$), and supplying the synchronization and scanning signals, the protection signals, the mixer signals and if necessary the reference signal of the high frequency generator (15).

8 Claims, 11 Drawing Figures

ELECTRONIC CAMERA

The present invention relates to an electronic camera.

Various types of very elaborate electronic cameras are already known.

These very elaborate, multi-purpose cameras have the disadvantage of being based on very complex electronic means and their consequent high cost prevents their being used for a very diverse range of applications or in large numbers.

The object of the present invention is to provide an electronic camera of simple construction but very reliable in operation, notably regarding the synchronisation of various circuits to enable, in particular, an output signal to be provided in accordance with official standards.

More particularly, the invention intends to provide an electronic camera which uses little current, enabling it to be used with batteries of small power.

To this end, the invention relates to an electronic camera with a vidicon tube, characterised in that it comprises a synchronisation generator consisting of a frequency divider receiving the frequency of a quartz crystal controlled pilot oscillator and, by a combination process, supplying the various synchronisation signals.

According to a characteristic feature of the invention, the synchronisation generator piloted by the quartz oscillator consists of a first stage comprising the quartz oscillator energising the two gates and furnishing an output frequency, successively divided by dividing circuits, and supplying the respective signals to a to a combining stage which combines the various respective signals and supplies the synchronisation and scanning signals, the protection signals, the blanking control, the mixer signals and, if necessary, the reference signal of the high frequency generator.

According to another characteristic feature of the invention, the image scanning circuit consists of a receiver circuit for receiving image synchronisation signals which control a saw tooth signal generator energising an amplifier stage connected directly to the deflection coil.

According to another characteristic feature, the camera comprises a protection circuit consisting of a logical assembly receiving a synchronisation signal from the synchronisation generator, as well as a signal linked to the presence of a vertical deflection signal and a horizontal deflection signal, and provides an output signal corresponding to the simultaneous presence of these three input signals, the output signal actuating the very high voltage transformer for the vidicon tube. The very high voltage power circuit of the vidicon tube comprises essentially a transformer, the primary of which receives the protection circuit signal transmitted by a transistor.

The power supply can be a source of alternating current or of direct current.

More particularly, the low voltage power supply consists of a rectifying transformer circuit supplying two direct current reference voltages, as well as, in parallel, a direct current power circuit, provided with protection means.

It is important that one of the protection means comprises a photo-emissive diode connected in reverse, so as to emit a light signal when the source of direct potential is connected in reverse.

Lastly, the power supply, regulated by integrated circuits, enables most diverse sources of power to be used, either of alternating current, or of direct current.

Errors of any type made in connecting the direct current source are prevented by means of a signalling diode.

The synchronisation generator, using a quartz oscillator, enables extremely precise, multiple reference frequencies to be obtained, which pilot the camera assembly, including any transmitter. The signal generator, by means of successive combinations, enables all the signals required by the scanning, power and mixer circuits to be generated. This method is particularly important for the mixer whose three switching transistors are controlled by distinct signals. All interactions which could falsify the resultant signals are thus eliminated.

In view of the means used to obtain image (vertical) synchronisation signals and line (horizontal) synchronisation signals, great definition is ensured in the analysis of the optical image. This enables a vidicon tube of small dimensions to be used, which not only reduces the cost advantageously, but also results in much greater enlargement, since the analysis area of the vidicon tube is smaller for a given optical image. Thus for a 16 mm lens, using a vidicon tube with an area of half a square inch (3 cm$^2$) a four times optical enlargement is obtained, whereas for a conventional 24 times 36 mm size, a 16 times enlargement is obtained. These enlargements are possible by means of the invention, without any loss of definition, using conventional lenses.

Finally, thanks to the protection circuit, the vidicon tube is effectively protected against accidental destruction if one of the deflection circuits stops.

Moreover, the regulation of the voltages of the assembly of the electrodes allows the life span of the assembly to be extended considerably and to exceed 4000 to 6000 hours.

The present invention will be described in greater detail with the aid of an embodiment of a television camera according to the invention represented in the drawings.

The following description will be restricted to the new parts of the various circuits and will not cover the known elements.

Figure 1:
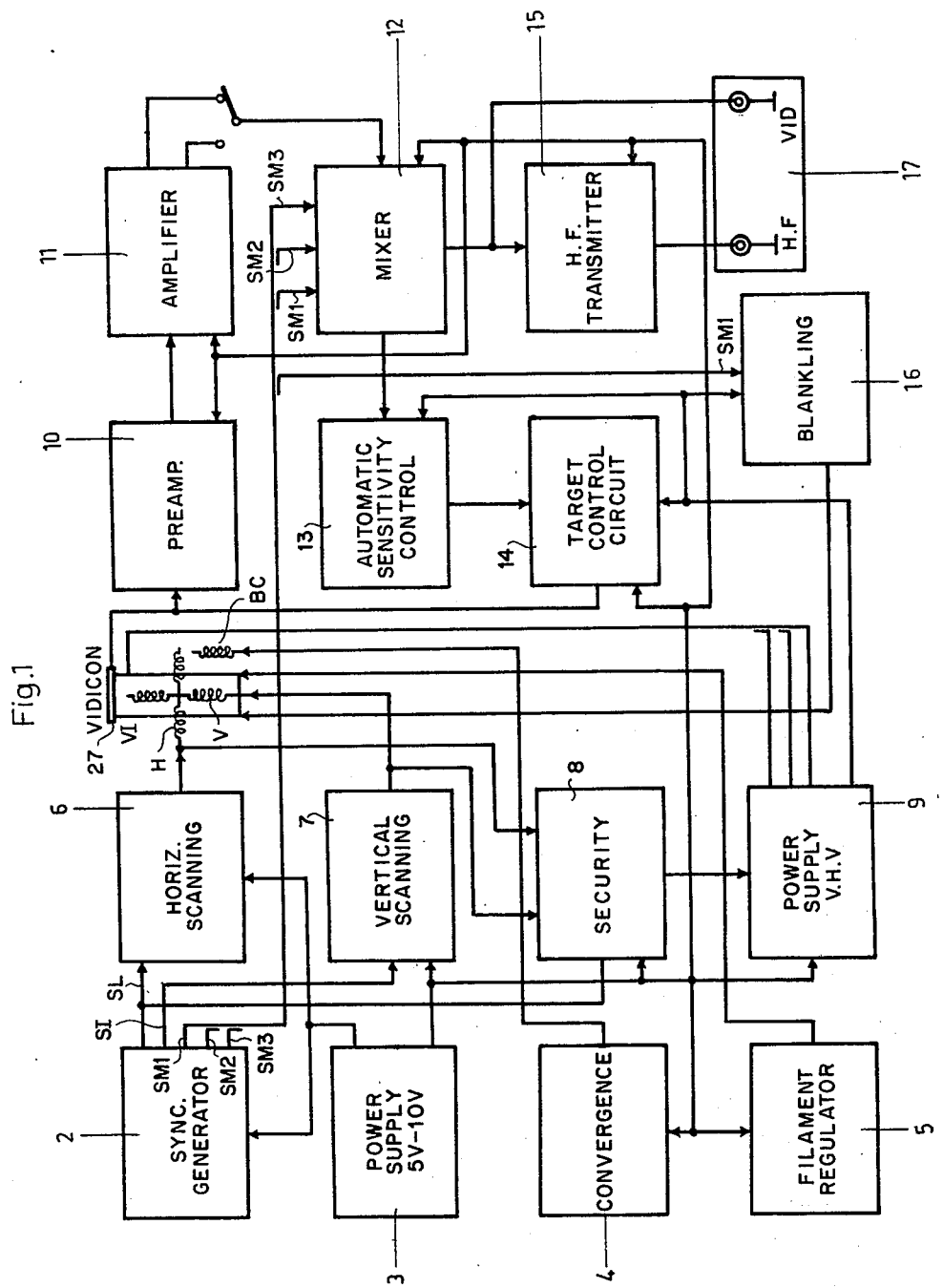
FIG. 1 is a block diagram of the electronic camera according to one embodiment of the invention.

According to the drawings, and in particular FIG. 1, the invention relates to an electronic camera, which comprises a vidicon tube VI receiving an optical image by means of a lens that is not shown. This vidicon tube VI is scanned by means of a horizontal scanning circuit 6 and a vertical scanning circuit 7. The scanning operation is synchronized by a synchronisation signal generator 2. The assembly is powered by a low voltage power supply 3, supplying, for example, voltages of 5 and of 10 volts. The vidicon tube VI is also connected to a convergence circuit 4 and a filament regulation circuit 5. These circuits 4 and 5 are of conventional type.

The protection circuit 8 detects the two scannings at the deflection yoke of the vidicon tube VI and enables pulses to be passed to the VHV power supply 9, itself connected to the vidicon tube VI.

The signals developed by the vidicon tube VI pass to the pre-amplifier 10, and then to the amplifier 11, as well as to a target control circuit 14, itself controlled by the automatic sensitivity control 13. Control 13 is connected to a mixer 12 which receives signals from the synchronisation generator 2 as well as the signals of the amplifier 11, and directs them to the HF transmitter 15, and then to the HF output, and to the video output VID of the output station 17.

Finally, the synchronisation generator 2 is connected to the blanking circuit 16, itself connected to the vidicon tube 6 to earth the vidicon cathode by presenting positive suppression signals applied also to the mixer 12.

Figure 2:
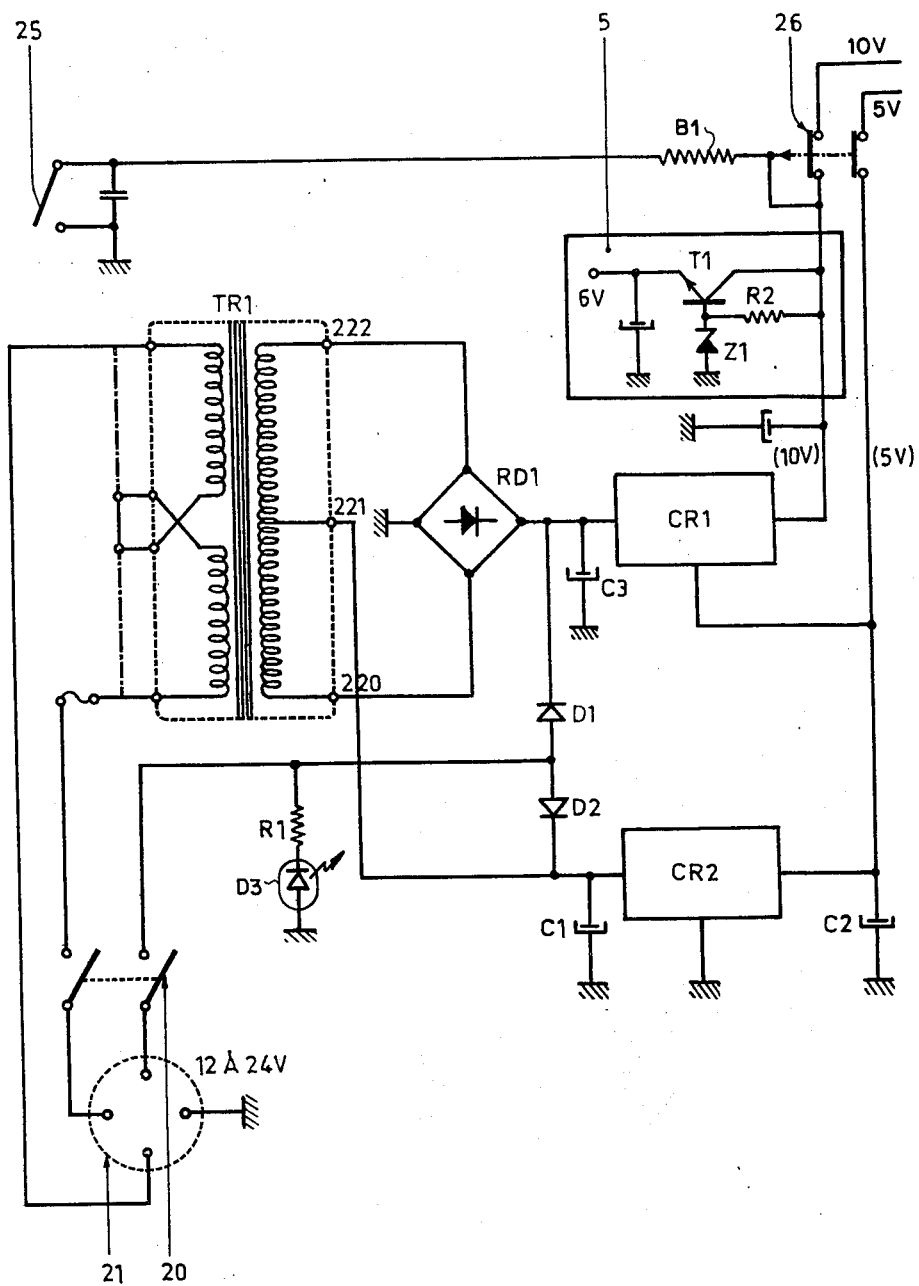
FIG. 2 is a circuit diagram of the low voltage power supply and filament regulation circuits of the camera in FIG. 1.

The low voltage power supply 3 of the electronic camera is represented in detail in FIG. 2. This power supply can be energized from a mains supply (110,220V), or a battery (12 to 24V). The connection is made by means of the double input connectors 21 connected by a switch 20 (on-off) to a transformer $TR_1$ and rectifier $RD_1$ for alternating current, and to the diodes $D_1$, $D_2$ output detailed later for the direct current power supply. The transformer $TR_1$ has taps for 110 and 220 volts. The output terminals 220, 222 are connected to a Graetz bridge constituting the rectifier $RD_1$.

The third apex of the Graetz bridge is connected to earth and the fourth apex supplies the output voltage which is passed to the regulating circuits $CR_1$, $CR_2$, such as the circuits LM 309 K to regulate the voltage and supply output voltages of 5 and 10 V.

If a battery power supply of 12 to 24 volts is chosen, it is connected by means of two security diodes D1 and D2, to the two regulating devices $CR_1$, $CR_2$ to provide the two direct current voltages 5V, 10V. The centre tap 221 of the transformer $TR_1$ is connected to earth by the capacitor C1. The same applies to the output of the second regulating circuit $CR_2$, by means of the capacitor C2 and the input of the first regulating circuit $CR_1$, by means of a capacitor C3.

In order to signal any polarity inversion when a battery is connected, as a source of current, an inverted luminescent diode $D_3$ is provided. This diode $D_3$ delivers current to the protection resistor $R_1$.

The electroluminescent diode $D_3$ can, for example, be a a gallium arsenide diode.

Lastly, this power supply 3 comprises an external stop control switch 25, actuating the coil B1 of a double pole relay 26, connected to the two voltage outputs of 5 and 10 volts. Closing switch 25 energizes coil B1 to open relay 26 and deenergize the camera; conversely, when switch 25 is open, the camera is energized.

The filament regulating circuit 5, shown in FIG. 2, consists of a transistor $T_1$ of which the base is connected to the earth by means of a Zener diode Z1. The collector is connected to one of the direct current voltage lines (10 volts). The base is also connected to this line by means of a resistor $R_2$. The emitter is connected to the vidicon filament, not shown in FIG. 2, supplying a voltage of 6.3 V.

Figure 3:
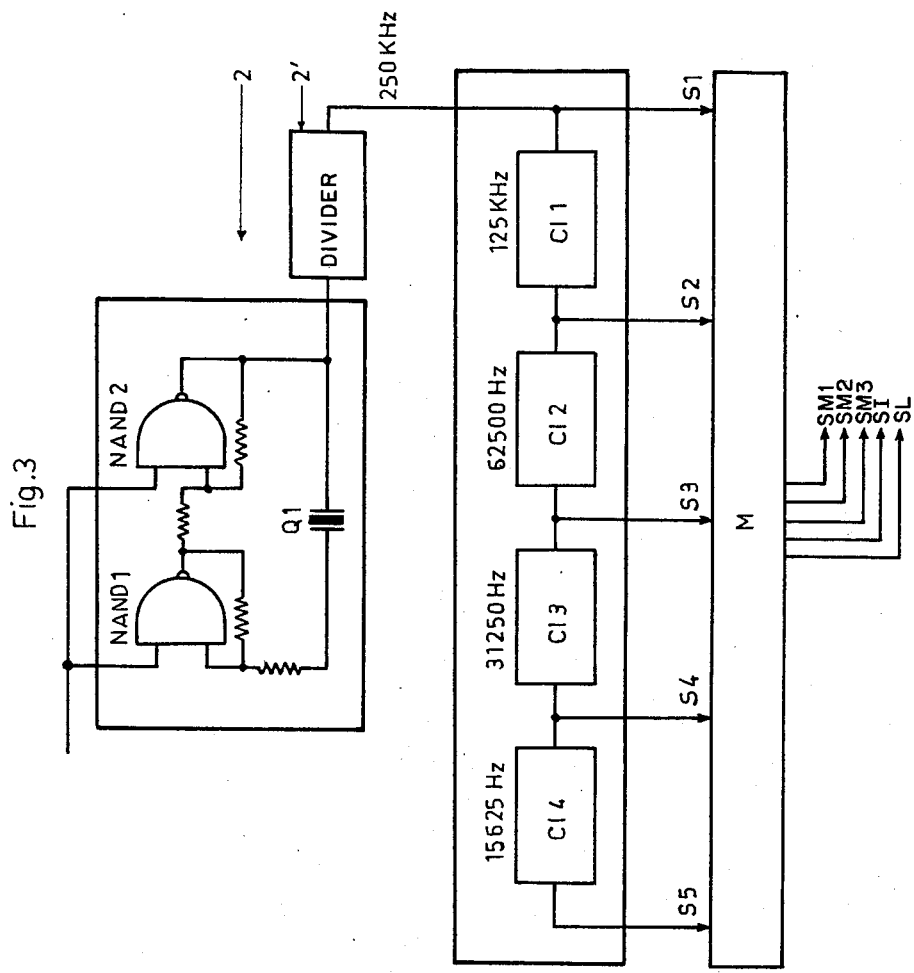
FIG. 3 is a simplified diagram of the synchronisation signal generator.

The synchronisation generator 2, shown in FIG. 3, basically comprises means for synchronising the fields of the scanned image, synchronising the lines, synchronising the mixer, and the positive and negative modulation suppressions, and synchronising the HF transmitter.

To this end, the synchronisation generator 2 consists of a quartz oscillator Q1 resonating at the frequency of 4 MHz.

This oscillator comprises two gates NAND 1 and 2, both connected to the low voltage supply which supply a frequency of 4 MHz. A frequency dividing circuit 2' divides this frequency by a factor of 16 and gives a frequency of 250 KHz; a type 7493 counter circuit is suitable for device 2'.

The output signal from the preceding stage 2' is passed through a series of frequency dividers $CI_{1-4}$, such as integrated circuits of type 7490. These circuits give frequencies divided by two, respectively: $S_1$, $S_2$, $S_3$, $S_4$, and $S_5$. The signals are passed to a combining device M which supplies, by logically combining input signals, the output signals $SM_1$, $SM_2$, $SM_3$, SL, and SI which are passed to the various circuits of the assembly. In this way, all the circuits are synchronised with the same reference frequency, namely that of the quartz oscillator $Q_1$ which provides synchronisation with an accuracy of between $10^{-5}$ and $10^{-6}$. The signals $SM_1$, $SM_2$, $SM_3$, and SL are all pulse signals having a frequency equal to the desired horizontal scanning frequency (e.g., the 15,625 Hz frequency of signal S5). The pulse duration and polarity may be varied as needed to fit the requirements of the circuits in which they are used. Signal SI, on the other hand, is a pulse signal at the desired vertical scanning frequency (e.g., 25 Hz for a 625 line image). For the specific circuits illustrated in FIGS. 4–8, signal $SM_1$ comprises negative-going pulses of 12 microseconds duration, signal $SM_2$ is the inverse of $SM_1$, $SM_3$ comprises positive-going pulses of 6 microseconds duration delayed 2 microseconds relative to the pulses of $SM_1$ and $SM_2$, and SL comprises positive-going pulses of 8 microseconds duration. All of these signals may vary substantially, depending upon the scanning parameters selected for the camera and the circuits actually employed.

In general, according to the invention, image synchronisation is effected on the basis of the sign of the synchronisation signal SI by the formation of a signal and then amplification of the signal thereby obtained.

Figure 4:
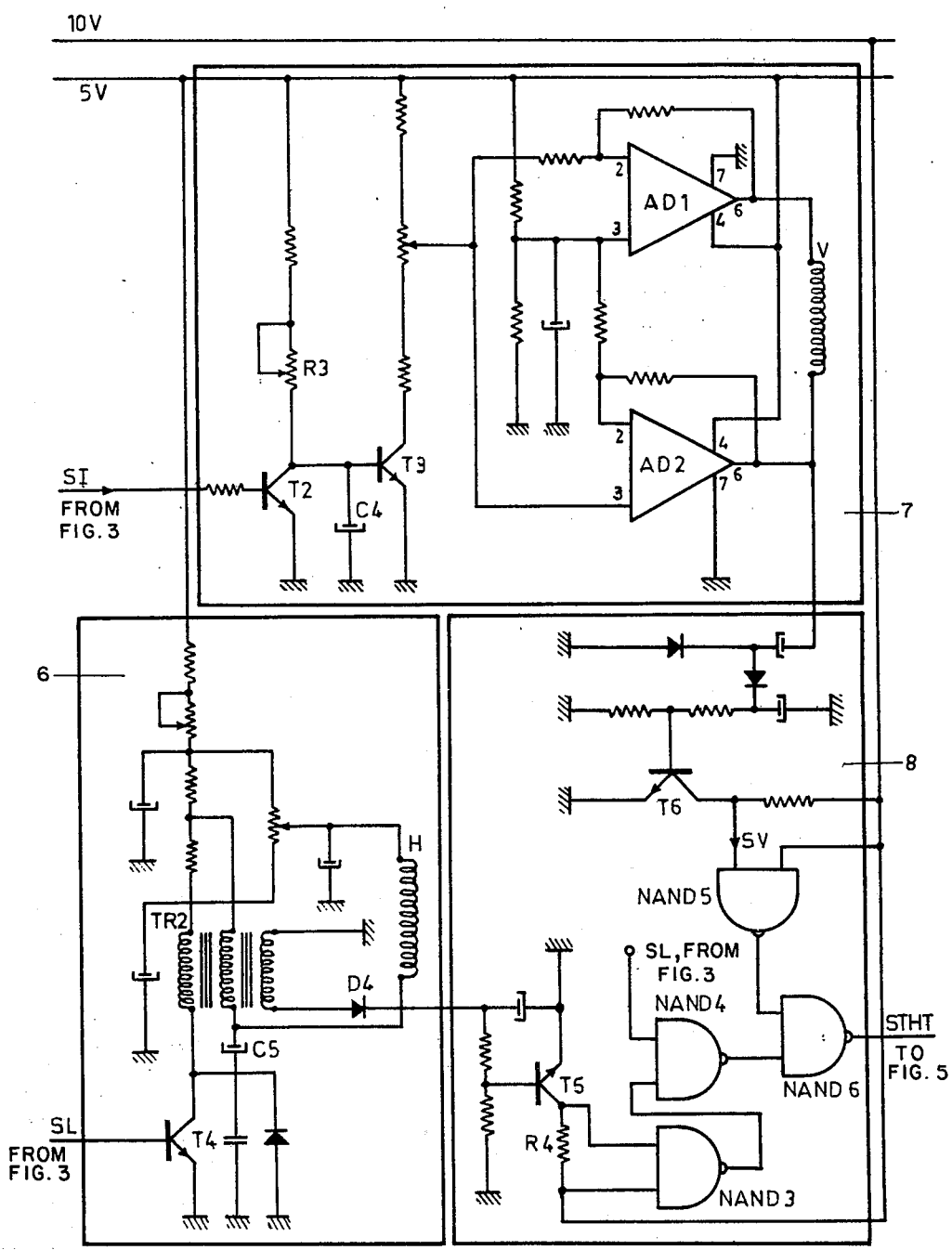
FIG. 4 is an electronic diagram of the scanning circuits and the protection circuit.

Thus, according to FIG. 4, the vertical scanning circuit 7, which receives the image synchronisation signal SI, from mixer M (FIG. 3). Signal SI is applied to the base of the transistor $T_2$, and discharges the capacitor $C_4$ of the R-C oscillating circuit, which is adjustable by means of the resistor $R_3$. The signal supplied is applied to the base of the transistor $T_3$, which controls the two differential input amplifiers $AD_1$, $AD_2$, which directly energise the vertical deflection coil V.

The horizontal scanning circuit 7 (FIG. 4) receives the synchronisation signal SL, from mixer M (FIG. 3). Signal SL is applied to the base of the transistor $T_4$ mounted in a blocking circuit comprising the capacitor $C_5$ and the transformer $TR_2$. The line synchronisation signal is supplied by the discharge of the capacitor $C_5$ which energises directly the horiziontal deflection coil H.

The protection circuit 8 is designed not to furnish pulses to the VHV circuit 9 (FIG. 1) only during image scanning or horizontal scanning. To this end, two scannings are detected. The image scanning is detected directly at the terminal of the deflection coil V. The horizontal scanning is detected from the blocking circuit by the third winding of the transformer $TR_2$, which sends the signal to the protection circuit 8 through the diode $D_4$. The protection circuit 8 basically consists of four gates $NAND_{3-4-5-6}$, grouped two by two. The gate $NAND_3$ receives the signal corresponding to the horizontal scanning from the collector of the transistor $T_5$ on one input; the other input of $NAND_3$ receives a direct current voltage of 10 volts. The resistor $R_4$ connects the collector of the transistor $T_5$ to the 5V direct current voltage line.

The output of the gate $NAND_3$ is sent to one of the inputs of the gate $NAND_4$, of which the other input receives the protection signal SL supplied by the synchronisation circuit 2. The output of the gate $NAND_4$ is connected to one of the inputs of the gate $NAND_6$, of which the other input receives the output signal from a gate $NAND_5$. The gate $NAND_5$ receives the vertical scanning signal SV on one input. The vertical signal SV is transmitted by the transistor $T_6$ to one of the inputs of the gate $NAND_5$, the other receiving the power supply voltage of 5V.

The convergence circuit 5, shown in FIG. 4, is of the conventional type. The converging coil BC is connected to the collector of the transistors $T_7$, of which the base is connected to the tap on a regulating resistor, potentiometer $R_5$.

Figure 5:
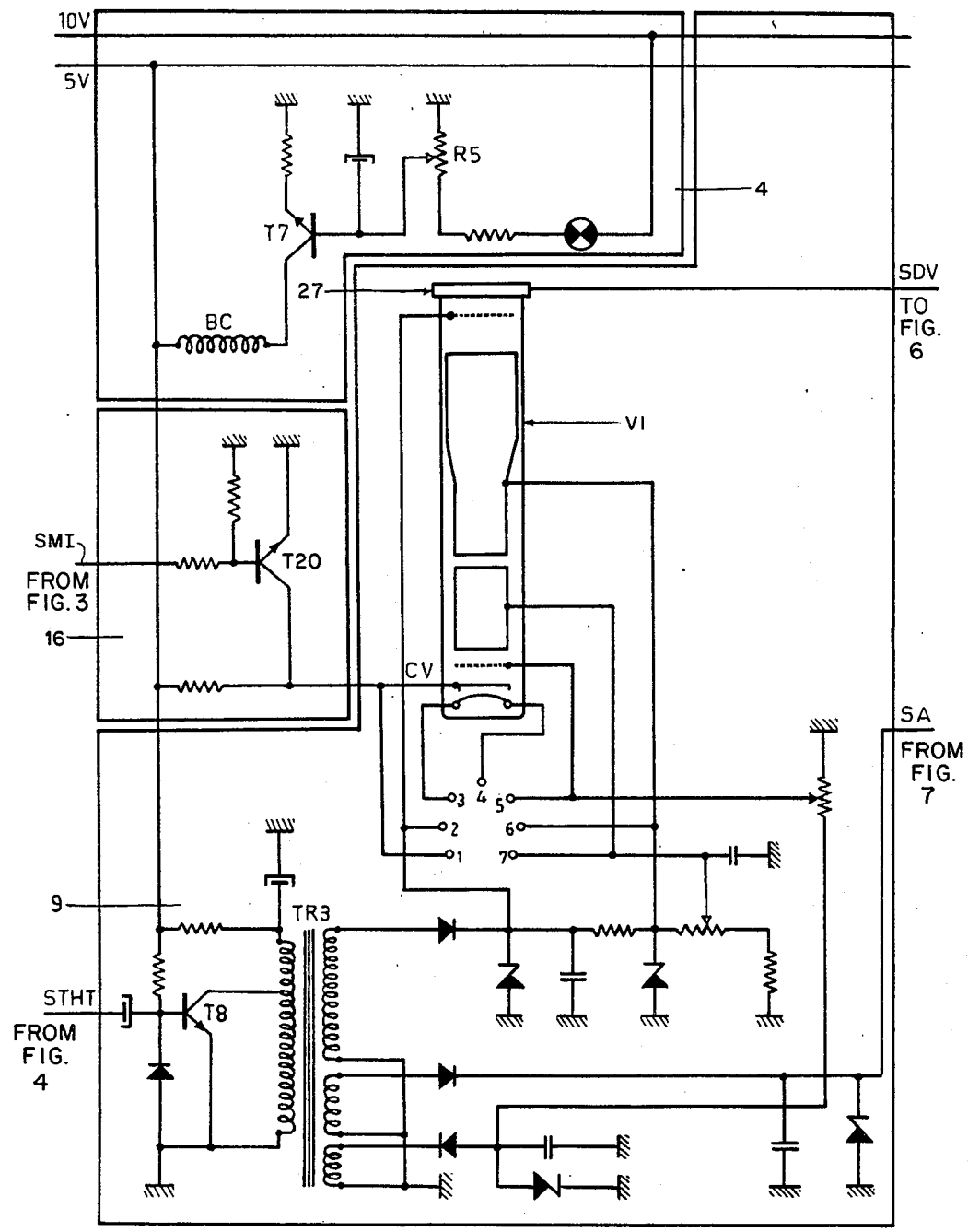
FIG. 5 shows the VHV power supply diagram of the vidicon tube, the blanking circuit and the convergence circuit.

According to FIG. 5, the blanking circuit 16 consists of a transistor $T_{20}$ of which the base is controlled by the signal SM1 from mixer M (FIG. 3). Signal SM1 periodically earths the cathode CV of the vidicon tube VI, at the line scanning frequency.

The VHV power supply circuit 9 (FIG. 5), connected, for example to the 5 volt line, consists of a transistor $T_8$ and a very high voltage transformer $TR_3$. The transistor $T_8$, of which the base receives the signal STHT supplied by the gate $NAND_6$ of the protection circuit 8 (FIG. 4), energises directly the primary coil of the transformer $TR_3$. The transformer $TR_3$, charged by rectifiers with diodes of the conventional type, provides direct current voltages, required by the vidicon, but only in the presence of pulses (signal STHT) coming from the protection circuit 8.

Figure 7:
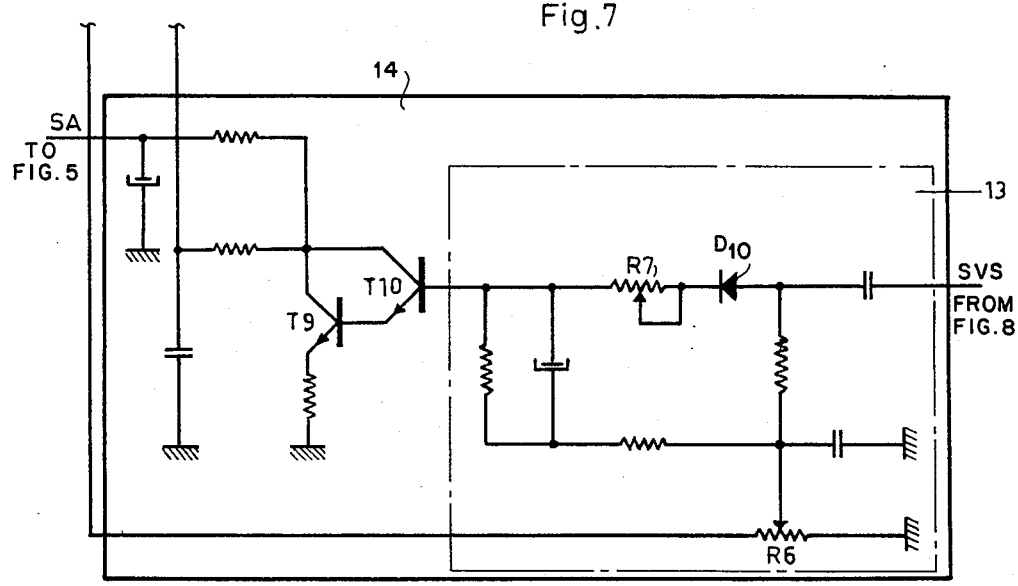
FIG. 7 shows the automatic gain control circuit.

The automatic sensitivity control 13, according to FIG. 7, controls the voltage on the vidicon target 27 (see FIG. 5). This control is effected by an automatic control combined with a medium threshold manual regulator.

The circuit 13 (FIG. 7) supplies a sensitivity control signal SA to the transformer $TR_3$ (FIG. 5) through the target control circuit 14 (FIG. 7). This circuit 14 consists of a Darlington type amplifier, the operating point of which is determined by the summation of the voltages, resulting from the rectification of the video-frequency signal SVS from mixer 12 (FIG. 8) by the diode D10, and of that imposed by the adjustment of the potentiometer R6.

The signal SDV, obtained on the target 27, energises the pre-amplifier 10 (FIG. 6), which comprises a field effect transistor FET. This circuit further comprises the transistor $T_{11}$ of which the collector energizes the amplifier 11. The amplifier 11 basically consists of an AM integrated circuit amplifier preceded by a phase shift circuit consisting of two capacitors $C_5$, $C_6$ and a transistor $T_{12}$. The gain of this AM amplifier is regulated by the resistor $R_6$ potentiometer $R_{16}$.

The differential output $SD_1$, $SD_2$ of the AM amplifier is looped by a potentiometer P (FIG. 8), from which the connector takes the output signal SS as such. The signal SS passed is applied to the mixer 12. When the tap of the potentiometer P assumes one of the two extreme positions, the image is normal, and for the other it is inverted (negative image). When the tap assumes a mean position, an intermediate image is obtained. This arrangement is particularly advantageous for the examination of the composition of image signals from a given optical image. In this way the vidicon tube can serve for the analysis of negative photographs, the composition and the gradation of the shades of an image, etc.

The mixer 12 (FIG. 8) consists of three switching transistors $T_{13}$, $T_{14}$, $T_{15}$ receiving the distinct signals $SM_1$, $SM_2$, $SM_3$ from the synchronisation circuit 2. The transistor $T_{13}$ is connected to the base of the input transistor $T_{16}$ of the mixer 12 by a potentiometer P2. The base SS from the transistor $T_{16}$ is energised by the differential signal of the amplifier 11. The collector of the input transistor $T_{16}$ is connected to the base of the output transistor $T_{17}$ which sends the signal, either to the VID video output, or to the high frequency transmitter 15, supplying the HF output signal. The transmitter 15 itself is piloted by the synchronisation circuit 2.

Figure 6:
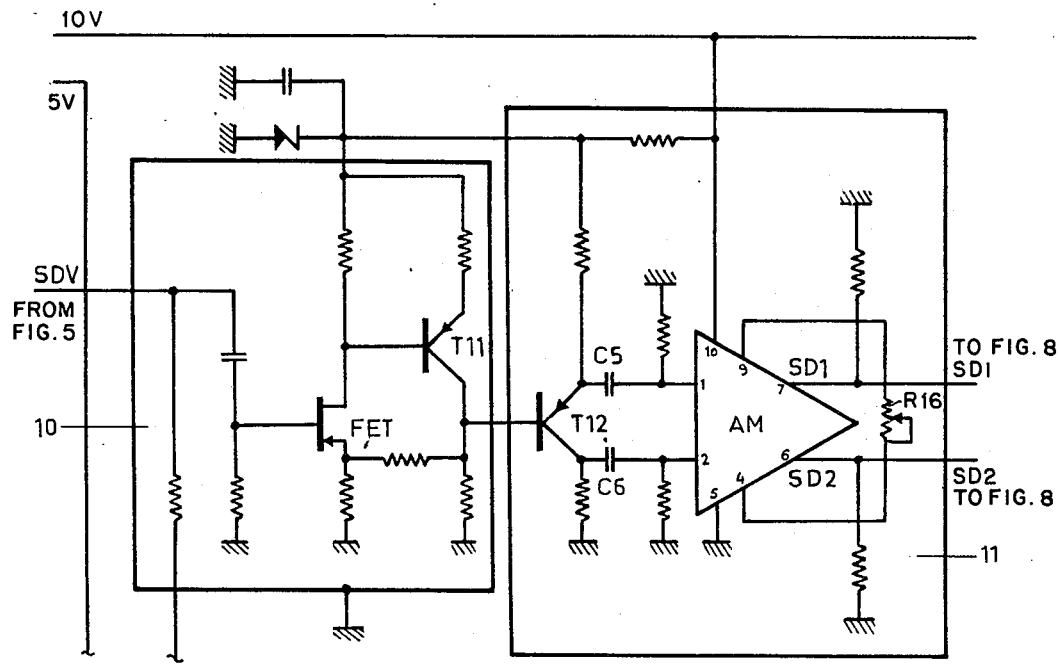
FIG. 6 shows the video pre-amplifier and amplifier.
Figure 8:
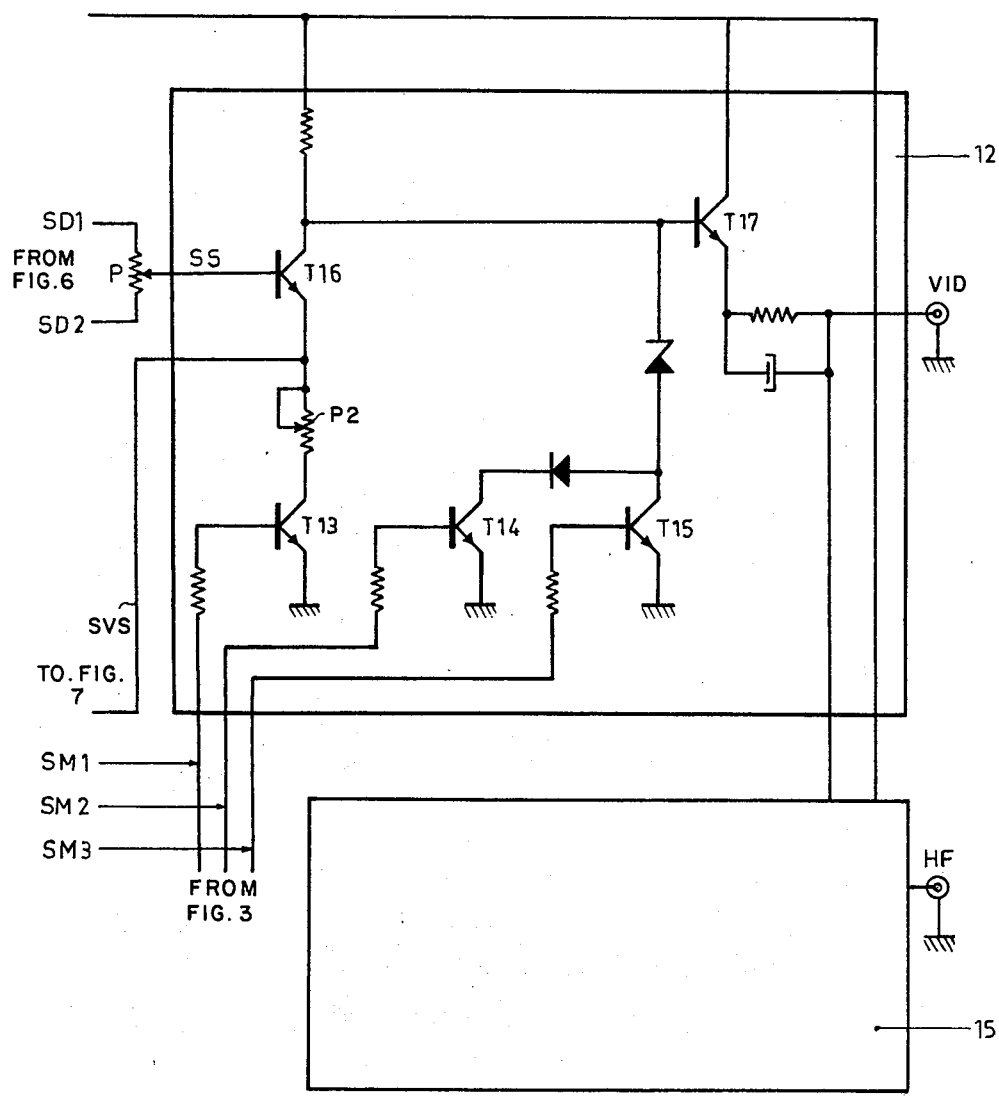
FIG. 8 represents the mixer and the HF generator, the latter shown schematically by a rectangle.
Figure 9:
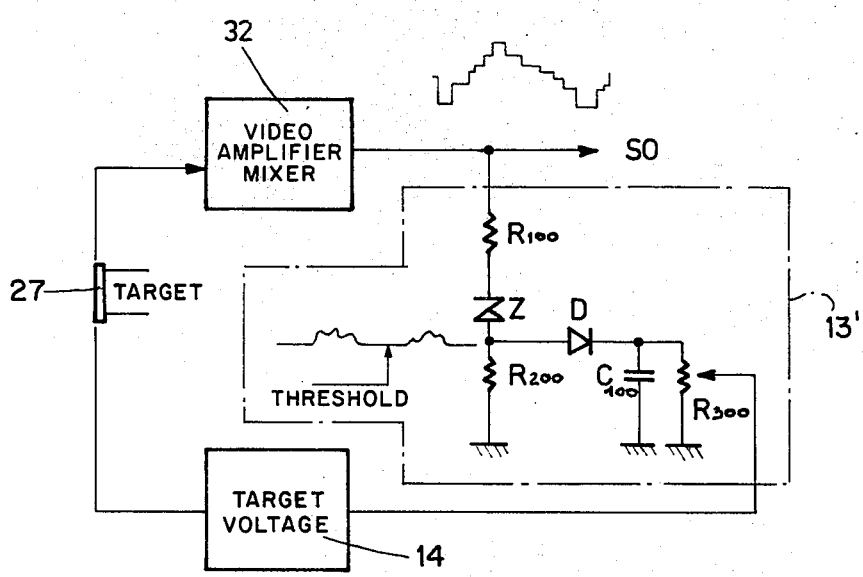
FIG. 9 is a simplified block diagram of the output signal limitation circuit of the automatic sensitivity control amplifier.

A limiting or sensitivity control circuit 13, shown in FIG. 9, is simplified by comparison with the circuit 13 in FIGS. 6–8. In FIG. 9 the target 27 is connected to a target voltage circuit 14 and to a single-ended video amplifier 32. The latter furnishes the output signal SO which has the form which is represented schematically.

The signal SO is transmitted only above a threshold value defined by the Zener diode Z connected in series with the resistors $R_{100}$ and $R_{200}$ between earth and the output of the video amplifier 32, the junction point of the Zener diode Z and the resistor $R_{200}$ being connected, by means of a directing diode $D_{100}$, to the assembly in parallel of the capacitor $C_{100}$ and the resistor $R_{300}$. This resistor $R_{300}$ is in fact a potentiometer whose tap is connected to the input of the target voltage circuit 14.

When the video amplifier 32 is saturated, in a conventional assembly with capacitor links, the mean value of the detected signal would become nil by negative reaction, and the target voltage would attain its maximum value. This would correspond to a positive reaction to the loop that could destroy the target.

Thanks to the assembly described above, the direct current component of the video voltage of the camera is transmitted to the circuit 14 by the automatic sensitivity control 31. The effect of the amplifier 31 is limited, for weak illumination of the target 27, by the Zener diode Z, which fixes a voltage threshold. This threshold depends on the Zener diode or diodes used.

In the case of the video amplifier being saturated, the voltage applied to the target 27 of the camera is equal to the saturation voltage of the video amplifier less the Zener voltage of the diode Z. A minimum voltage is thus ensured for the target.

Figure 10:
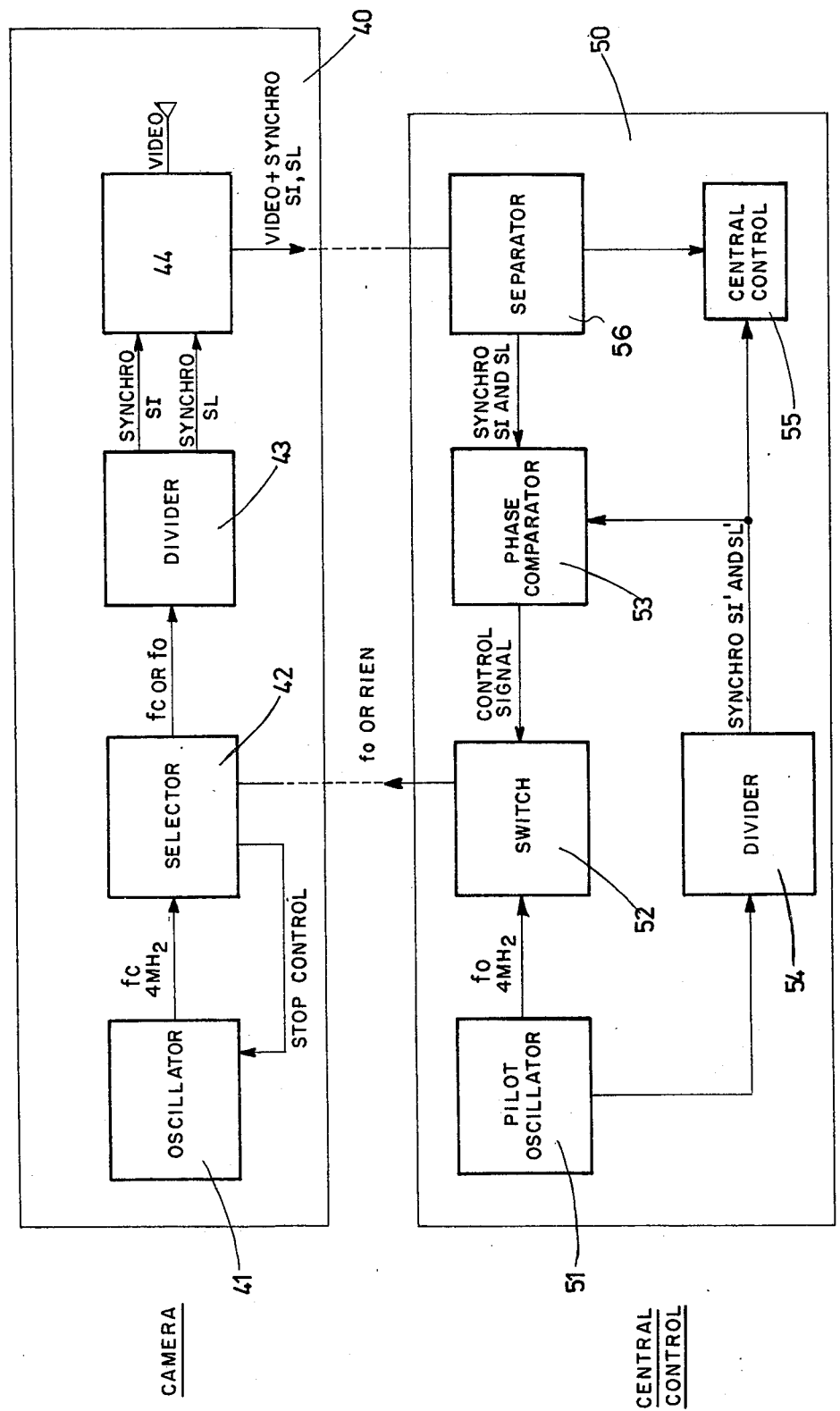
FIG. 10 represents shows a block diagram of a variant of the synchronization system of the camera.

The camera synchronisation system acting as a control centre, shown in FIG. 10, consists of a camera oscillator 41 providing a pilot frequency, for example, of 4 MHZ, to a selector 42 which is connected to a divider 43 or a synchronisation generator supplying an image synchronisation signal SI and a line synchronisation signal SL to a mixer 44. The assembly 41, 42, 43, 44 constitutes part of the camera.

The selector 42 is connected to the camera oscillator by a stop control loop. The selector 42 as well as the mixer 44 of the circuit 40 of the camera, are connected to the pilot circuit of the central control 50. This central control circuit consists of a pilot oscillator 51 supplying a pilot frequency $f_0$ equal, like the preceding one, to 4 MHZ. The pilot oscillator is connected to the switch 52, which sends either the signal of frequency $f_0$, or no signal to the selector 42. The switch 52 is connected to a phase comparator 53 which furnishes the control signal. The pilot oscillator 51 supplies a signal to the divider or synchronisation generator 54 which supplies synchronisation signals SI' and SL' to the phase comparator 53 and to the central control circuit 55. The circuit 50 also comprises a separator 56 which receives a signal from the mixer 44 of the circuit 40 and which supplies a signal to the central control monitor 55, as well as camera synchronisation signals, SI and SL to the phase comparator 53.

The circuit, described above, compares the return image synchronisation signals SI and the camera line synchronisation signal SL with the corresponding signals SI' and SL' obtained by the division of the pilot frequency from oscillator 51.

The phase comparator 53 controls the transmission of the pilot frequency $f_0$ to the camera, when the phase is correct in regard to central control. On the other hand, when the phase is not correct (no phase difference), the comparator actuates the switch 52 and stops the transmission of the pilot frequency $f_0$. The internal oscillator 41 of the camera circuit 40 then supplies the synchronisation frequency $f_c$ to the selector 42 which transmits this frequency to the divider 43 furnishing the image synchronisation signals SI and the line synchronisation signal SL.

The transition from one mode of operation to another is effected with the aid of beats which are produced by the signals that are very close to one another sent to the phase comparator 53. This necessarily results in that at a certain moment the camera synchronisation signal coincides in phase with the corresponding signal supplied by the divider 54 from the pilot oscillator 51. At that moment, the switch 52 opens and allows the pilot frequency $f_0$ to pass to the selector 42 which stops the passage of the frequency $f_c$ of the camera oscillator 41.

Figure 11:
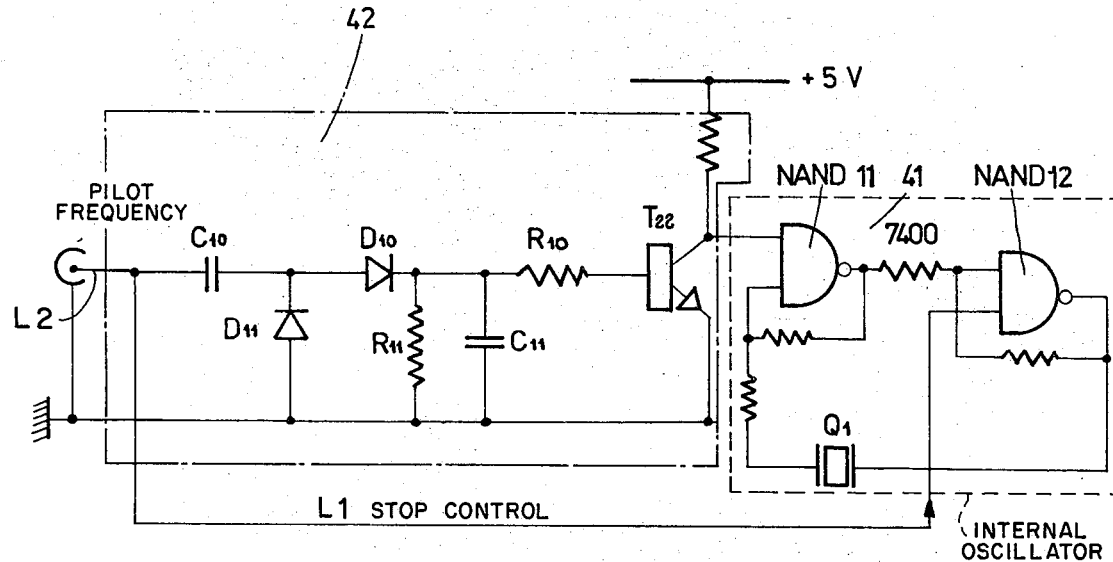
FIG. 11 shows an embodiment of a frequency selector for the circuit in FIG. 10.

FIG. 11 shows the electronic construction of the oscillator 41 and the selector 42. In this figure, the camera oscillator 41 is shown to be a quartz oscillator $Q_1$ and two gates NAND-11 and NAND-12 which supply the frequency $f_c$.

The selector 42 receives the pilot frequency by means of the input line $L_2$ and supplies the stop control signal by means of the line $L_1$ to the internal oscillator 41 of the camera. The selector is constituted by the assembly in series of an input capacitor $C_{10}$, a diode $D_{10}$ connected in the forward direction, and a resistor $R_{10}$ connected in series to the base of the transistor 22. The cathode of the diode $D_{10}$ is connected to the earth by the assembly in parallel of a resistor $R_{11}$ and a capacitor $C_{11}$. The junction point of the capacitor $C_{10}$ and the anode of the diode $D_{10}$ is connected to the earth by means of a diode $D_{11}$.

Thus in general, all the clock signals of the various electronic circuits of the camera are piloted by signals supplied by the synchronisation generator 2, which itself forms them from the resonance frequency of the quartz resonator $Q_1$.

This provides many advantages and ensures complete synchronisation stability.

Thanks to this piloting means, the complexity of the various circuits in the camera is reduced, and in particular the consumption of electricity is reduced. This enables small size batteries to be used, which reduces the size and the weight of the camera by diversifying the applications.

Apart from the very many, conventional applications of electronic cameras, such as in video systems etc., such cameras can also be used for more particular but very important applications.

The camera can serve for the analysis of photographic images. Thanks to the modulation passing continuously from positive to negative modulation, using potentiometer P (FIG. 8), it is possible, starting from a negative, to obtain a direct, visual positive, without printing.

This is a case of simple modulation inversion.

In more complex cases, for example, of an underexposed or over-exposed negative, the gradation of the modulation to an intermediate value enables this exposure error to be corrected by, if necessary, displaying directly the exposure correction during printing.

Another particularly interesting application relates to the composition of pictures such as those for publicity purposes. By examining the composition with the camera according to the invention, and by graduating the modulation, the most advantageous effect can be obtained by continuously varying the adjustment.

It is obvious that the invention is not limited to the example of its embodiment herein above described and illustrated. If need be, other modes and other forms of embodiment can be envisaged without departing from the scope of the invention.

What I claim is:
1. An electronic camera comprising:
    a camera tube including a target electrode requiring excitation at a high voltage;
    a high voltage power supply connected to said camera tube target electrode;
    video amplifier means having an input connected to the target electrode of the camera tube, for developing a video output signal;
    and an automatic sensitivity control comprising:
    a rectifying circuit connected to an output of said video amplifier, for developing a control signal representative of the D.C. component of said video output signal, said rectifying circuit comprising a diode connected between said video amplifier output and a target control circuit means;
    adjustable impedance means, connected to said rectifying circuit, for adjusting the amplitude limits of said control signal, said adjustable impedance means comprising an adjustable resistance interposed in series between said diode and said target control circuit means;

and said target control circuit means being connected to said rectifying circuit and to said high voltage power supply to vary the output level of the high voltage applied to the target electrode in accordance with variations in said control signal and thereby control the sensitivity of the camera tube in accordance with image content.

2. An electronic camera, according to claim 1, in which said target control circuit comprises a Darlington amplifier having its input connected to the output of said rectifying circuit, and having its output connected to said high voltage supply.

3. An electronic camera comprising:
a camera tube including a target electrode requiring excitation at a high voltage;
a high voltage power supply connected to said camera tube target electrode;
video amplifier means having an input connected to the target electrode of the camera tube, for developing a video output signal;
and an automatic sensitivity control comprising:
a rectifying circuit connected to an output of said video amplifier, for developing a control signal representative of the D.C. component of said video output signal, said rectifying circuit comprising, in series, a first resistance, a Zener diode, and a second resistance, connected from the video amplifier output to a plane of reference potential, and a rectifier diode connected between the common terminal of the Zener diode and the second resistance and a target control circuit means;
adjustable impedance means, connected to said rectifying circuit, for adjusting the amplitude limits of said control signal;
and said target control circuit means being connected to said rectifying circuit and to said high voltage power supply to vary the output level of the high voltage applied to the target electrode in accordance with variations in said control signal and thereby control the sensitivity of the camera tube in accordance with image content.

4. An electronic camera, according to claim 3, in which the adjustable impedance means comprises a potentiometer connected from said rectifier diode to a plane of reference potential and having a tap connected to said target control circuit.

5. An electronic camera comprising:
a camera tube including a target electrode requiring excitation at a high voltage;
a high voltage power supply connected to said camera tube target electrode;
video amplifier means having an input connected to the target electrode of the camera tube, for developing a video output signal,
said video amplifier means comprising a push-pull amplifier having two output terminals at which image signals of opposite polarity are developed, and a potentiometer connected across said output terminals, the tap on said potentiometer being adjustable to afford a continuous output modulation adjustment varying from a full positive modulation to a full negative modulation;
and an automatic sensitivity control comprising:
a rectifying circuit connected to an output of said video amplifier, for developing a control signal representative of the D.C. component of said video output signal;
adjustable impedance means, connected to said rectifying circuit, for adjusting the amplitude limits of said control signal;
and target control circuit means connected to said rectifying circuit and to said high voltage power supply to vary the output level of the high voltage applied to the target electrode in accordance with variations in said control signal and thereby control the sensitivity of the camera tube in accordance with image content.

6. An electronic camera according to claim 5 and further comprising a phase-splitting circuit interposed between said target electrode and said push-pull amplifier.

7. An electronic camera according to claim 5 in which said rectifying circuit comprises a diode connected between said video amplifier output and said target control circuit, and in which said adjustable impedance means comprises an adjustable resistance interposed in series between said diode and said target control circuit.

8. An electronic camera according to claim 5, in which said rectifying circuit comprises, in series, a first resistance, a Zener diode, and a second resistance, connected from the video amplifier output to a plane of reference potential, and a rectifier diode connected between the common terminal of the Zener diode and the second resistance and said target control circuit.

* * * * *